United States Patent

Voss et al.

[11] 4,045,269
[45] Aug. 30, 1977

[54] TRANSPARENT FORMABLE POLYURETHANE POLYCARBONATE LAMINATION

[75] Inventors: David Lehmann Voss, Chatsworth; William Albert Miller, Thousand Oaks; Ralph David Hermansen, Northridge, all of Calif.

[73] Assignee: Sierracin Corporation, Sylmar, Calif.

[21] Appl. No.: 643,247

[22] Filed: Dec. 22, 1975

[51] Int. Cl.² .................................................. B29C 19/00
[52] U.S. Cl. .................................. 156/221; 156/242; 156/246; 156/306; 428/423
[58] Field of Search .......... 156/241, 306, 99, 102, 156/106, 221, 222, 196; 428/412, 423; 156/243, 246; 264/248, 1, DIG. 57; 244/129 W

[56] References Cited

U.S. PATENT DOCUMENTS

| | | | |
|---|---|---|---|
| 3,001,901 | 9/1961 | Barkley | 156/222 |
| 3,069,287 | 12/1962 | Hudson | 428/412 |
| 3,341,391 | 9/1967 | Hamilton et al. | 428/412 |
| 3,388,032 | 6/1968 | Saunders | 428/425 X |
| 3,458,388 | 7/1967 | Moynihan | 156/306 X |
| 3,567,057 | 3/1971 | Landen | 215/9 |
| 3,655,432 | 4/1972 | Hausslein | 428/412 |
| 3,671,370 | 6/1972 | Littell | 428/412 X |
| 3,900,655 | 8/1975 | Wolgemuth et al. | 428/412 X |

Primary Examiner—David A. Simmons
Attorney, Agent, or Firm—Christie, Parker & Hale

[57] ABSTRACT

A method for producing clear, cured transparent polycarbonate laminates comprises directly bonding a sheet of transparent thermosetting polyurethane sheet to a polycarbonate sheet to produce a laminate, heating the laminate above the softening point of the polycarbonate sheet, and forming the laminate to a desired curvature.

26 Claims, 4 Drawing Figures

TRANSPARENT FORMABLE POLYURETHANE POLYCARBONATE LAMINATION

BACKGROUND OF THE INVENTION

Polycarbonate plastics possess outstanding strength, impact resistance, clarity, and formability. For these reasons, polycarbonate plastics have been used as a substitute for glass in such applications as eyeglass lenses, airplane canopies, and airplane windows. However, polycarbonate is not without disadvantage. It is easily scratched and abraded, particularly by ice, high velocity rains, and sand; it is attacked and crazed by solvents; it is difficult to polish; and it is subject to discoloration, crazing and cracking from ultraviolet light. Therefore, attempts have been made to coat the polycarbonate to protect it from the environment, while taking advantage of polycarbonate's high strength and toughness.

One attempt is described in U.S. Pat. No. 3,810,815 which discloses a transparent laminate formed by diffusion bonding acrylic resin sheet to polycarbonate sheet. The resulting product overcomes many of the disadvantages of polycarbonate. Although the acrylic sheet is relatively soft, scratches on it are easily removed merely by polishing the marred area. In addition, acrylic is fairly stable from a chemical standpoint and it accepts ultraviolet light stabilizers without significantly impairing its clarity.

However, acrylic is crazed by aggresive solvents such as ketones (acetone, methyl ethyl ketone), aromatic hydrocarbons (benzene, toluene), lacquer thinners, paint strippers, and chlorinated solvents at low stress levels. Furthermore uncured acrylic cannot be cast directly onto the polycarbonate sheet because methyl methacrylate monomer crazes and attacks polycarbonate. In addition, it has been found in practice that the combination of acrylic and polycarbonate results in a loss in toughness of the polycarbonate sheet. It is theorized that cracks initiated on the surface of the acrylic propagate through the lamination and result in low impact strength for the acrylic/polycarbonate combination.

To overcome this crack propagation problem, inerlayers have been used to insulate the polycarbonate from the deleterious effects of the acrylic. Interlayers typically are made of silicone rubber or polyvinylbutyral. Although interlayers overcome the problem of loss of impact strength of the polycarbonate, the resulting three layer lamination, depending on the choice of interlayer, is difficult and costly to manufacture, cannot be easily formed, has high weight, and has low temperature resistance and low clarity compared to polycarbonate. In addition the dibutyl sebacate plasticizer used in aircraft grade polyvinylbutyral interlayers can craze the polycarbonate.

Another system used to protect polycarbonate from the environment involves coating polycarbonate with organic coatings from 0.0005 inch thick. By using such thin coatings, the coated polycarbonate product can easily be formed into irregular shapes such as airplane canopies. However, these coatings are too thin for incorporation of enough ultraviolet light stabilizers to be effective, and thus the product loses adhesion when exposed to sunlight. Furthermore, exposure to UV radiation and moisture has been shown to be the cause of surface crazing of naturally weathered polycarbonate in areas such as Arizona and Florida. UV light tends to degrade the bond between the protective coating and causes the coating to peel off. In addition, the coating is attacked by some solvents. Also, abrasive solids, such as ice and sand, and high velocity rain rapidly scour off the coating. Rain erosion tests show that thin protective coatings are removed in only five minutes when exposed to rain at 500 miles per hour.

Another method of protective polycarbonate sheet is described by Hudson in U.S. Pat. No. 3,069,287. This patent discloses protecting polycarbonate with thin polyurethane coatings whereby a polycarbonate article is immersed in a sulfuric acid solution of an alkali metal dichromate, the article is dried, and then coated with a polyurethane coating solution. However, the resulting product cannot be formed. Furthermore, solvent in the polyurethane coating solution can attack the polycarbonate during the casting operation. In addition, thin solvent based coatings are removed in seconds when exposed to rain striking the coating at speeds of 600 mph, a common airplane air speed. Also, solvent cast coatings must be very thin or else they adversely affect the optical qualities of the polycarbonate.

Another method of protecting polycarbonate from the ravages of the environment is disclosed in U.S. Pat. No. 3,388,032, issued to Sanders. This patent describes a five layer laminated article consisting of a sheet of polycarbonate sandwiched between two sheets of thermoplastic polyurethane, which in turn are sandwiched between two sheets of glass. However, this product is not suitable for applications where a curved laminate is required because it cannot be formed due to the presence of the glass. Also, glass adversely affected the impact properties of a laminate, since the glass splinters under impact and glass splinters may strike the pilot in case of a bird impact.

Thus, no material is available which has all the properties required for high performance transparencies such as aircraft windows and canopies. It is therefore desirable to provide a product which is transparent, resists chemical attack, has high toughness and impact strength, resists the effects of weathering, including ultraviolet light, rain, ice, and sand, and can be formed to the curvatures required for aircraft windows and canopies.

SUMMARY OF THE INVENTION

These and other features are provided in practice of our method for producing curved, transparent, polycarbonate laminates protected by polyurethane. These curved transparent polycarbonate laminates are produced by preparing a transparent thermosetting polyurethane sheet and directly bonding the sheet to a polycarbonate sheet. The laminate is then heated to a temperature at which the polycarbonate sheet softens, and formed to the desired curvature.

The polyurethane sheet is formable, i.e., has a Shore D hardness less than about 70 and a tear strength greater than about 50 pounds per linear inch (pli) at a temperature within the range of temperatures $T_1$ to $T_2$ in which the polycarbonate sheet also is formable. $T_1$ represents the polycarbonate sheet heat deflection temperature. $T_2$ is higher than $T_1$ and represents the polycarbonate sheet chain scission temperature.

In one embodiment, the polyurethane sheet is separately prepared and then fusion bonded to the polycarbonate sheet. In another embodiment laminates are produced by casting uncured liquid polyurethane onto the polycarbonate sheet and curing the polyurethane sheet in situ. In a third embodiment the cured in situ polyurethane sheet is then fusion bonded to the polycarbonate sheet to improve the polyurethane/polycarbonate bond.

In order to have optimum UV resistance and hydrolytic stability it is preferred that the polyurethane sheet be fabricated by reacting aliphatic diisocyanates with polyalkylene ether polyols. For optimum clarity, it is preferred that the aliphatic diisocyanate by 4,4'-methylene bis (cyclohexyl isocyanate).

DRAWINGS

These and other features and advantages of the present invention will be appreciated as the same becomes better understood by reference to the followng detailed description of a presently preferred embodiment when considered in connection with the accompanying drawings wherein.

DESCRIPTION OF THE INVENTION

Figure 1:
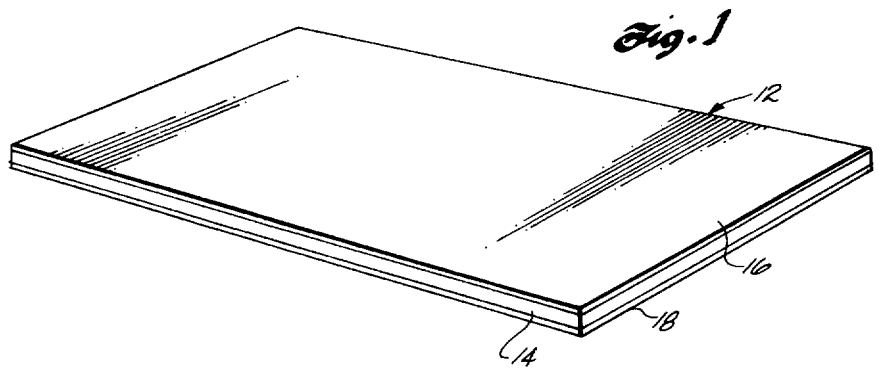
FIG. 1 illustrates a perspective side view showing a transparent laminate constructed in accordance with principles of the present invention.

This invention comprises the steps of preparing a transparent thermosetting polyurethane sheet, directly integrally bonding the polyurethane sheet to a polycarbonate sheet to produce a laminate, heating the laminate to a temperature at which the laminate can be formed, and then forming the laminate to a desired curvature. This invention contemplates the forming of the laminate in both single and complex curvatures. This invention also contemplates attaching a polyurethane sheet to both faces of the polycarbonate sheet.

As used herein, the term "form" refers to any process by which the shape of a sheet is altered, and includes, but is not limited to, bending, shaping, stretching, compressing, curving, and arching a sheet.

Polycarbonate sheets suitable for this invention can be prepared by the method described in U.S. Pat. No. 3,671,370, issued to Littell, which is hereby incorporated by reference. Polycarbonate sheets having properties as set forth hereinafter made by other techniques can also be used.

The preferred polycarbonates used are based upon 2,2-bis(4-hydroxy-phenyl) propane, which is known as Bisphenol A. These polycarbonates exhibit high strength, high clarity, and are easily formed. Suitable polycarbonate sheets are fabricated from Bisphenol A methane by General Electric Company, Plastics Division, Pittsfield, Mass. Under the tradename "lexan". Suitable polycarbonate material is also available from Mobay-Chemical Co. of Pittsburg, Pennsylvania.

Typically the polycarbonate sheet has a thickness of from about 0.060 inch to about one inch, and preferably from about 0.25 inch to about one inch when used for aircraft windows.

The polyurethane sheet is prepared by reacting an organic polyisocyanate and an active hydrogen containing material. The materials must be substantially anhydrous to prevent loss of clarity due to the release of carbon dioxide from the reaction of water with isocyanate groups.

The selection of isocyanates and active hydrogen containing materials for preparing the transparent thermosetting polyurethane sheet is limited by the physical properties which the sheet must have. Since the polyurethane/polycarbonate laminate is formed after it is prepared, the polyurethane must be "rubbery" at temperatures within the temperature range $T_1$ to $T_2$ in which the polycarbonate sheet is formable. For example, in the case of polycarbonate produced from Bisphenol A, the polycarbonate is easily formed at temperatures in the range of from about 270° $F(T_1)$ to about 375° $F(T_2)$. A polycarbonate sheet is formable at a temperature about its heat deflection temperature and below its chain scission temperature. Heat deflection temperature is determined using ASTM method D 648 with a 264 psi load. Thus $T_1$ represents the polycarbonate sheet heat deflection temperature and $T_2$ represents the polycarbonate sheet chain scission temperature. $T_2$ is greater than $T_1$. At forming temperatures below the polycarbonate sheet heat deflection temperature $T_1$, the polycarbonate sheet is too rigid to be easily formed and crazing of the polycarbonate sheet may result. At forming temperatures above the polycarbonate sheet chain scission temperature $T_2$, the optical properties, ductility, toughness and tensile strength of the polycarbonate sheet deteriorate. Therefore, the polyurethane must also be easily formable and "rubbery" in at least part of this temperature range of $T_1$ to $T_2$.

Although the term "rubbery" is difficult to define, it has been found that polyurethanes having a Shore D hardness less than about 70 and a tear strength greater than about 50 pli at the forming temperature are sufficiently "rubbery" for forming curved transparent polycarbonate laminates. Tear strength is determined using ASTM method D 624 with Die C. When the polyurethane sheet has a Shore D hardness greater than about 70, a laminate prepared from the sheet is too rigid to be easily formed. Similarly, when the polyurethane sheet has a tear strength less than about 50 pli, a laminate prepared from the sheet is not sufficiently rigid to be formed, i.e., the laminate is formed so easily that it is difficult to control the forming process so as to obtain uniform complex shapes. Therefore the isocyanate and active hydrogen containing compounds used for preparing the transparent thermosetting polyurethane sheet should produce a sheet with a Shore D hardness less than about 70 and a tear strength greater than about 50 pli at temperatures at which the polycarbonate sheet can be formed. Examples of suitable polyurethanes prepared from commercially available materials are described below in Examples 1-3.

Polyisocyanates useful for preparing the polyurethane sheet can be monomeric or polymeric, and can be aromatic or aliphatic. A blend of polyisocyanates can be used. Among the organic polyisocyanates that can be employed are the various organic compounds containing two or more isocyanate groups, or mixtures of such compounds, including aromatic, aliphatic and cycloaliphatic diisocyanates and triisocyanates, and combinations thereof. Representative compounds include 2,4-toluene diisocyanate, m-phenylene diisocyanate, 4-chloro-1,3-phenylene diisocyanate, 4,4'-diphenylene diisocyanate, 3,3'-dimethyl-4,4'-diphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexyl diisocyanate, 4,4'-methylene-bis (cyclohexyl isocyanate), 1,5-tetrahydronaphthylene diisocyanate, p-xylene diisocyanate, durene diisocyanate, and 1,2,4-benzene triisocyanate. The diisocyanates may contain other substituents which do not react with isocyanate groups. In the case of the aromatic compounds, the isocyanate groups may be attached either to the same or to different rings. Dimers of monomeric diisocyanates, and di(isocyanatoaryl) ureas such as di-(3-isocyanato-4-methyl-phenyl) ureas may be used.

Preferably, aliphatic and cycloaliphatic isocyanates are used to combat discoloration in sunlight. The preferred cycloaliphatic isocyanate is 4,4'-methylene-bis (cyclohexyl isocyanate) which exhibits excellent yellowing resistance, and when reacted with polyalkylene ether polyols, yields polyurethanes with a high degree of clarity, as described below. This material, 4,4'-methylene-bis (cyclohexyl isocyanate), is available from E. I. du Pont de Nemours and Company of Wilmington, Delaware, under the tradename "Hylene W" in a formulation which has an isomeric content of about 50% trans isomer and about 50% cis isomer.

The active hydrogen containing material used for preparing the polyurethane can be monomeric or polymeric.

The presence or absence of active hydrogen atoms is determined by the Zerewitinoff test which is described by Kohler in volume 49 of the Journal of the American Chemical Society, page 3181(1927). According to this test, active hydrogen atoms are generally found in monomeric and polymeric materials having one or more of the following groups: OH, COOH, $NH_2$, and NRH where R is any organic radical. The preferred materials containing an active hydrogen atom are those with an OH group, and especially polyalkylene ether polyols, which yield products with good hydrolytic stability. The term "polyalkylene ether polyols" refers to compounds which result from the reaction of an alkylene oxide and a compound having at least two active hydrogen atoms. The polyalkylene ether polyols have a molecular weight from about 100 to about 2000, and preferably from about 300 to about 1500.

Only thermosetting cross-linked polyurethane sheets have high resistance to chemical attack, high toughness and impact strength, high rigidity, and high resistance to the effects of weathering, including ultraviolet light, rain, ice, and sand. Therefore, at least some compounds containing at least three active hydrogen atoms are reacted with the alkylene oxide to produce a thermosetting polyurethane.

Compounds having at least three active hydrogen atoms which may be employed in the preparation of the polyalkylene ether polyols include aliphatic alcohols such as glycerol, trimethylolpropane, pentaerythritol, sorbitol and sucrose; organic acids such as aconitic, trimellitic and hemimellitic, inorganic acids such as the phosphoric acids; amines such as ethylene diamine, propylene diamine, diethylene triamine, and triisopropanolamine, phenolic compounds such as pyrogallol, dihydroxybenzoic acid, hydroxyphthalic acids and inositol mercaptans such as 1,2,3-propane trithiol and amides such as benzene disulfonamide. Mixtures of any of the above compounds may also be employed. The particular compound which is employed is not critical since it constitutes only a small porportion of the weight of the polyol. All that is important is that the compound have at least three active hydrogen atoms.

The polyalkylene ether polyols are prepared by standard art procedures such as catalytic polymerization of the oxide and the compound having at least three active hydrogen atoms. An alkaline catalyst such as potassium hydroxide is often employed in this polymerization.

Polyols having four, five and even up to ten hydroxyl groups per molecule are operative. However, as the number of hydroxyl groups increases, the rigidity of the product increases, which makes it more difficult to bend the polycarbonate/polyurethane laminate. Therefore, it is preferred that compounds containing no more than four hydroxyl groups be used in preparing the polyalkylene ether polyols.

For improved hydrolytic stability, it is preferred that saturated aliphatic polyalkylene ether polyols can be used for preparing the polyurethanes of this invention. Thus the preferred alkylene oxides used in preparation of the polyalkylene ether polyols include methylene oxide, ethylene oxide, propylene oxide, isopropylene oxide, and butylene oxide, and the like.

If it is desired to improve the tensile elongation and tear strength of the polymers prepared according to this invention, diols may be employed along with triols and tetrols in the preparation of the polyurethanes. Any of the diols which are known in the art are suitable for this purpose, and especially polyalkylene either diols. Diols with a molecular weight of about 100 to 2,000 are satisfactory, and preferably the diols have a molecular weight of about 500 to about 1,000.

The choice of polyalkylene ether polyols used for polyurethanes of this invention affects the physical properties of the polyurethane. For example, as the molelcular weight of the polyol increases, the flexibility of the polyurethane increases, particularly at high temperatures. Thus at high temperatures the polyurethane loses its physical properties, and therefore is less satisfactory for preparing high performance polyurethane/polycarbonate laminates. As the polyol molecular weight decreases, the polyurethane's rigidity increases and the material becomes less formable and less impact resistant.

A blend of polyalkylene ether polyols can be used in preparing the polyurethanes of this invention. The appropriate molecular weight chosen for each polyol used in a blend depends upon molecular weight and functionality of the other polyols present. As the average, functionality of the polyols increases, the molecular weight also must increase to compensate for the increased rigidity resulting from the high number of cross links. For example, when only a triol is used, satisfactory polyurethanes are produced with the average molecular weight of the triol at about 450. When only a tetrol is used, the preferred molecular weight of the tetrol is about 600.

The number of carbon atoms in the alkylene oxides used in preparation of the polyalkylene ether polyols also affects the physical properties of the polyurethane. As the number of carbon atoms increases, the resulting product becomes more flexible and less rigid. Therefore, when a polyalkylene ether polyol is prepared from alkylene oxides such as pentylene oxide, polyols of higher functionality, or of lower average molecular weight, or both, are used to increase the rigidity of the polyurethane. Therefore the selection and proportions of the polyalkylene ether polyols used in preparing the polyurethane sheet requires balancing the functionality, the molecular weight, and the number of carbon atoms in the alkylene oxides used to make the polyol. As shown below by Example 3, a blend containing about 72% by weight of about 440 and about 28% by weight polyoxybutylene diol of average molecular weight of about 1000 when reacted with Hylene W yields a polyurethane useful for practice of this invention.

Although the urethanes of this invention preferably are prepared from polyalkylene ether polyols, other materials or mixtures of these materials with polyalkylene ether polyols may be used. These other materials include polyalkylene arylene ether polyols, polyalkylene ether thioether polyols, polyester polyols, polyamines, polyesters, polyester amides, polyacetals, and the like.

The ratio of isocyanates to active hydrogen groups is from about 0.95 to about 1.10, and preferably about 1.05. An excess of isocyanates is used to form allophanate bonds, and thereby increase the tensile strength of the polyurethane.

The thickness of the polyurethane sheet is preferably between about 0.01 inch and about 0.06 inch. Thicker sheets, which serve to increase the abrasion resistance of the laminate, are useful where high performance is required from the laminate as when the laminate is used for aircraft windshields. However, as the thickness of the polyurethane sheet increases, the weight of nonstructural material increases, which is undesirable for aircraft applications. To speed up the reaction of the isocyanate with the compound having an active hydrogen group, a catalyst may be used. Suitable urethane forming catalysts are those highly specific for the formation of polyurethane by reaction of —NCO and —OH groups and which have little tendency to accelerate side reactions. Catalysts such as stannous salts of organic acids and organotin compounds are preferred. Illustrative catalysts include stannous octoate, stannous oleate, dibutyltin diacetate, and dibutyltin dilaurate, the last name being especially preferred. Th amount of catalyst to be used in a particular system can routinely by determined by one skilled in the art. The preferred catalyst, dibutyltin dilaurate, is usually employed in amounts of about 0.0005 to about 0.1 part per 100 parts of the polymer forming ingredients. The amount of catalyst needed depends on the curing temperature. While the stannous and organotin catalysts are preferred, other catalysts can be used.

When aliphatic and cycloaliphatic compounds are used to form the urethanes, the resulting product has excellent resistance to the yellowing effects of sunlight. However, suitable ultraviolet light absorbent materials may be added to the polyurethane material.

The preferred ultraviolet light absorbent material is ethyl-2-cyano-3,3-diphenyl-acrylate, commercially available under the tradename Uvinol N-35 from GAF Corporation of New York, N.Y. From about 1 to about 4% by weight Uvinol N-35 imparts satisfactory ultraviolet light resistance to the polyurethane compounds of this invention.

Also, 2-(3', 5'-ditert-butyl-2'-hydroxy-phenyl)-5-chlorobenzotriozole, which is available from Geigy Industrial Chemicals of Ardsley, N.Y. under the tradename Tinuvin 327 is a useful UV-absorber for the polyurethane compounds.

In addition to ultraviolet light absorbers, antioxidants such as 4,4'-butylene-bis (6-tert-butyl-m-cresol) marketed under the same "Santowhite Antioxidant" by Monsanto Chemical Company may be added to the polyurethane to improve its ozone and high temperature resistance. Also organic soluble dyes or pigments can be added to the polyurethane to provide a desired tint.

The polyurethane sheet is prepared according to conventional methods. The first step is to remove any dissolved water in the polyalkylene ether polyols with a molecular sieve, or by heating and evacuating the polyol, or by using a desiccant.

This isocyanate and the anhydrous polyol, along with a catalyst, antioxidants, ultraviolet light absorbers, dyes, and pigments when used, are weighed out and mixed together. The resulting blend is then cast into sheets using methods well known in the art, such as casting the blend onto tempered glass sheets coated with a mold release agent. The polyurethane is allowed to cure until the polymerization reaction has gone substantially to completion. The curing can be done either at room temperature or at elevated temperatures. It has been found that room temperature cure takes from about 2 to about 24 hours. An accelerated cure at elevated temperatures where the polyurethane is cured for 1 hour at 150° F, an additional hour at 200° F, an additional half hour at 250° F, and an additional half hour at 330° F, results in a sheet with excellent physical properties.

The laminate of polycarbonate and polyurethane may be prepared according to a variety of techniques. One method of directly bonding the urethane to the polycarbonate is a fusion bonding process. In this process, the surface of the polycarbonate preferably is roughened to provide pathways for air which might otherwise be trapped between the polycarbonate and polyurethane sheets to escape. The surfaces of both materials are cleaned with isopropyl alcohol. The polyurethane and polycarbonate sheets are then placed together, and heated to a temperature sufficient to soften the polycarbonate. In the case of polycarbonate made from Bisphenol A, such as Lexan, the polycarbonate is heated to a temperature between about 270° F, and preferably to about 325° F. The sheets are heated in a vacuum so that oxygen in the air does not react with and degrade either the polycarbonate or polyurethane sheet and to insure that air is not trapped between the sheets. Pressure of from about 20 to about 200 psi is applied to the stack of the polyurethane and polycarbonate sheets to obtain good adhesion and optics. Best results are obtained with a pressure in the neighborhood of about 200 psi. At 200 psi the original extrusion or die lines in the polycarbonate sheets are removed and thereby optics of the sheet are improved significantly.

Referring to FIG. 1, a transparent laminate 12 of polycarbonate can be formed from one sheet of polycarbonate 14 between a top sheet 16 and a bottom sheet 18 of polyurethane. Thus a three layer laminate as well as a two layer laminate can be formed in one step.

U.S. Pat. No. 3,810,815 issued to Welhart et al describes in detail a fusion bonding process for polycarbonate where acrylic sheet is bonded to polycarbonate sheet. The method described therein has successfully have used for producing the polyurethane/polycarbonate laminates of this invention.

Instead of curing the polyurethane, and then fusion bonding it to the polycarbonate sheet, it is possible to combine the two steps by casting the uncured polyurethane liquid components directly onto the polycarbonate sheet after it is mixed. The polyurethane then integrally bonds to the polycarbonate as it cures in situ with no evidence of crazing or other degradation of the polycarbonate.

Another method for laminating the polyurethane sheet to the polycarbonate sheet is to combine the fusion bonding and the curing in situ methods. In this method uncured polyurethane is cast on a polycarbonate sheet and allowed to cure in situ. Then heat and pressure are applied in a vacuum as in the fusion bonding method.

Figure 2:
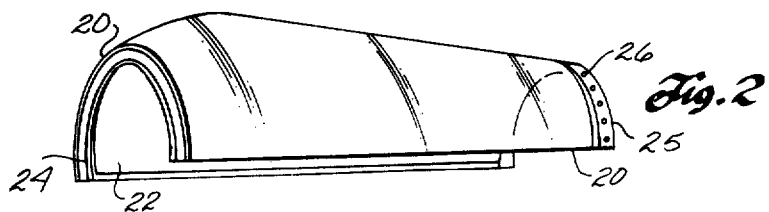
FIG. 2 is a perspective view in partial section of a typical canopy for an airplane produced according to principles of this invention.
Figure 3:
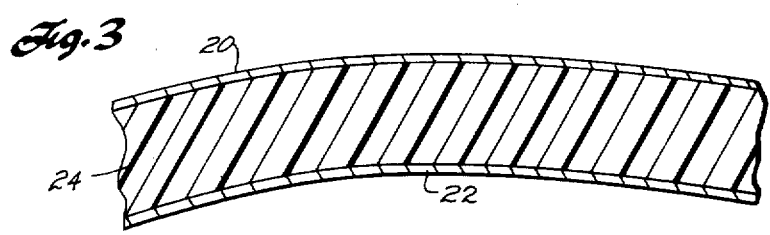
FIG. 3 is a fragmentary transverse cross section of a portion of the canopy of FIG. 2.

The laminate in FIG. 1 is curved by heating it to the temperature at which the polycarbonate and polyurethane soften, and then forming it. For example, a transparent window of an airplane such as a windshield or the canopy of FIGS. 2 and 3 is formed by heating a three layer laminate and applying pressure to it form it around a mandrel. The three layers consist of a thin outer layer 20 and thin inner layer 22 of polyurethane, and a thicker middle layer 24 of polycarbonate. The polyurethane provides weathering and abrasion resistance and the polycarbonate provides high impact strength and toughness. The canopy is secured to the airplane body by a flange 25 at the edge of the canopy having a plurality of bolts 26.

Other techniques of forming curved transparent polycarbonate laminates include vacuum forming and molding whereby male and female molds are used. Compound curves can be obtained with the laminates of this invention.

This invention is further illustrated by the following examples embodying principles of this invention where the physical properties of the examples are compared against materials used in the prior art.

EXAMPLE 1

Figure 4:
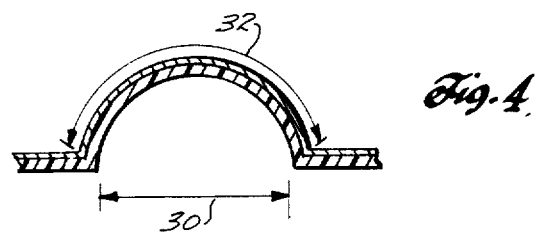
FIG. 4 is a cross-sectional view of a laminated product formed in accordance with principles of the present invention.

Polyoxypropylenetriol of average molecular weight of about 440, available from BASF Wyandotte Corporation of Wyandotte, Michigan, under the tradename Pluracol TP 440, was dried for two hours at 225° F and 1 mm Hg vacuum. 51.58 grams of the Pluracol TP 440 was mixed with 48.42 grams of Hylene W, the tradename for du Pont's 4,4'-methylene-bis (cyclohexyl isocyanate), which contains about 50% trans isomer, and 0.004 grams dibutyltin dilaurate. The resulting liquid was stirred and then poured between tempered glass sheets coated with a mold release agent and spaced apart a distance of 0.06 inches. The polyurethane was left overnight at room temperature to gel. It was then step cured by maintaining it at a temperature of 150° F for one hour, 200° F for one hour, 250° F for one half hour, and then an additional one half hour at 330° F. The resulting 0.06 inch thick polyurethane sheet was placed on top of a 0.30 inch thick polycarbonate sheet made by General Electric Company, Plastics Division, of Pittsville, Mass., sold under the tradename "Lexan". The Lexan sheet was about the same size as the polyurethane sheet and had a roughened surface. The sheets were then placed in a vacuum of 1 mm Hg, and maintained at a temperature of 330° F for four hours while under a pressure of 200 psi. A section of the resulting laminate was cooled, and then heated to 320° F. A vacuum of 7½ inches Hg was applied to the polyurethane side of the laminate, thereby forming a dome shape. The resulting dome is shown in FIG. 4 where the dome has a diameter 30, and a circumference shown by line 32. The formed dome had a circumference of 19.5 inches and a diameter of 9.5 inches. The dome had good clarity and was easily formed. The physical properties of the laminate are summarized in Table I.

EXAMPLE 2

A 0.03 inch thick polyurethane sheet was prepared from a polyoxypropylene tetrol based on pentaerythritol of average molecular weight of 500. The tetrol is available from BASF Wyandotte under the tradename Pluracol PEP 550. 47.53 grams of the tetrol, 52.47 grams of Hylene W, and 0.04 gram of dibutyltin dilaurate were used to prepare the polyurethane sheet according to the method of Example 1. The sheet was clad to a 0.30 inch thick Lexan polycarbonate sheet, and a portion of the resulting laminate was heated and formed into a dome. All steps were done according to the method of Example 1. The resulting product was transparent, and exhibited the physical properties reported in Table I.

EXAMPLE 3

A 0.3 inch thick polyurethane sheet was prepared from 41.26 grams of Pluracol TP 440, 15.67 grams of Teracol 1000, 43.07 grams of Hylene W, and 0.04 grams of dibutyltin dilaurate according to the method of Example 1. Teracol 1000 is the tradename of a polyoxybutylene diol of average molecular weight of about 1000 distributed by E. I. du Pont de Nemour Co., of Wilmington, Delaware. This sheet was directly bonded to a 0.30 inch thick Lexan polycarbonate sheet, and a portion of the resulting laminate was heated and formed into a dome. The resulting product was transparent, and the laminate exhibited the physical properties reported in Table I.

The physical properties of the Examples 1-3 are compared against the physical properties of Controls in Table 1. These Controls are materials currently used where curved transparent materials are required. Control 1 is a 0.125 inch thick methylmethacrylate acrylic, slightly cross linked, manufactured by Rohm and Haas of Philadelphia, Pa. under the tradename of "Plex 55". Control 2 is a 0.125 inch thick, non cross linked methylmethacrylate acrylic manufactured by Rohm and Haas under the tradename Plex II. Control 3 is a 0.125 inch thick acrylic sheet like that of Control 1 which has been stretched bilaterally. Control 4 is a 0.30 inch thick sheet of unlaminated polycarbonate used in Examples 1, 2 and 3. Control 5 is the same type of polycarbonate sheet used in Examples 1-3, coated with a thin organic abrasion resistant coating.

Results of a rain erosion test for Controls 1, 4 and 5 and Examples 1 and 3, are reported in Table 1. The rain erosion test was conducted by blowing droplets of water at the test samples at a 30° angle at 500 mph. Either light transmittance before and after the test was measured, or the effect of the rain on the surface of the test sample was noted.

The results of a salt test for all samples are presented in Table 1. Two blasts of salt, for one second each, with one second between blasts, were fired at each sample from a gun six inches from the sample with 80 psi of air pressure.

The abrasion resistance of the samples was measured with a Taber Abraser according to ASTM Method 1092-1. A load of 1,000 grams was used on a CS-10 Calibrase wheel for 50 revolutions. Results were determined by measuring the increase in haze before and after abrading. The greater the degree of abrasion damage, the greater the increase in haze.

Impact strength was measured by dropping a 50 lb. dart with a one inch diameter spherical tip at a room temperature sample from the distance indicated in Table 1.

As shown by the results presented in Table 1, the Examples 1–3 produced according to the method of this invention exhibit better resistance to rain and salt erosion, and generally have better abrasion resistance than both uncoated polycarbonate and polycarbonate coated with a thin organic coating. Compared to acrylic, the transparent polycarbonate laminates prepared according to the method of this invention have better resistance to rain and salt erosion, comparable abrasion resistance, and higher impact strength than acrylic.

In another test done to show the utility of the laminates of this invention, three windshields for a Cessna A-37 plane were prepared by bonding a 0.030 inch thick polyurethane sheet prepared according to the method of Example 3 to both sides of a 0.500 inch thick polycarbonate sheet. The windows successfully passed the U.S. Air Force Bird Impact Tests where 4 pound chickens are fired at the windows at a speed of 250 knots.

It has also been found that laminates of acrylic sheets and polyurethane sheets prepared according to methods as herein described exhibited much higher impact strength than stretched acrylic sheets alone.

An appendix lodged with the Patent Office presents the results of additional tests which show the utility of the laminates of this invention. As used in this appendix, Clad $4_{TM}$ refers to polyurethane having the composition of the polyurethane sheet of Example 1, Clad $5_{TM}$ refers to polyurethane having the composition of the polyurethane sheet of Example 2, and Clad $8_{TM}$ refers to polyurethane having the composition of the polyurethane sheet of Example 8.

Although the invention has been described in considerable detail with reference to certain embodiments thereof, it will be understood that variations and modifications can be effected within the spirit and scope of the invention as described above and defined in the appended claims.

greater than the temperature $T_1$, the polycarbonate sheet heat deflection temperature, and less than the temperature $T_2$, the polycarbonate sheet chain scission temperature;

b. thereafter directly bonding the polyurethane sheet to the polycarbonate sheet to produce a laminate wherein the polyurethane sheet is an outer layer of the laminate;

c. heating the laminate to at least $T_1$ and less than $T_2$; and d. forming the laminate to a desired curvature.

2. The method claimed in claim 1 wherein preparing the polyurethane sheet comprises reacting aliphatic diisocyanates with saturated polyalkylene ether polyols.

3. The method claimed in claim 1 wherein the step of preparing the polyurethane sheet comprises reacting a cycloaliphatic polyisocyanate with polyalkylene ether polyols.

4. The method claimed in claim 3 wherein the cycloaliphatic polyisocyanate is a cycloaliphatic diisocyanate.

5. The method claimed in claim 4 wherein the cycloaliphatic diisocyanate is 4,4'-methylene-bis (cyclohexyl isocyanate).

6. The method claimed in claim 1 wherein the step of directly bonding comprises fusion bonding the polyurethane sheet to the polycarbonate sheet.

7. A method as claimed in claim 1 wherein the polycarbonate sheet is fabricated from a polycarbonate based upon 2,2-bis(4-hydroxy-phenyl) propane.

8. A method as claimed in claim 1 wherein the step of preparing comprises preparing a polyurethane sheet at least about 0.01 inch thick.

9. A method for producing curved transparent polycarbonate laminates from polycarbonate sheet fabricated from a polycarbonate based upon 2,2-bis (4-hydroxy-phenyl) propane comprising the steps of:

a. preparing a substantially completely cured, rigid, transparent thermoset polyurethane sheet having a

TABLE I

| Sample | Simulated High Speed Rain Erosion | Salt Erosion (% haze) at Angle of Incidence | | Abrasion Taber Resistance (% haze) | Impact Strength | Hardness-Shore D at | |
|---|---|---|---|---|---|---|---|
| | | 90° | 30° | | | 75° F | 250° F |
| Control 1 | 5% loss of light transmittal at 5 minutes | 11 | 13 | 20 | ¼" shattered at 4 inches | 84 | 61 |
| Control 2 | — | 14 | 6 | 23 | ¼" shattered at 6 inches | 80 | 38 |
| Control 3 | — | 15 | 6 | 36 | | 80 | — |
| Control 4 | 3% loss of light transmittal at 10 minutes | 77 | 26 | 53 | medium dent at 6¼ ft. | 75 | 67 |
| Control 5 | 100% coating removal at 5 minutes | 66 | 6 | 26 | medium dent at 6¼ ft. | Not Applicable | |
| Example 1 | very slight pitting at 60 minutes | 35 | 8 | 26 | medium dent at 6¼ ft. | 73 | 33 |
| Example 2 | — | 24 | 10 | — | slight dent at 3 ft. | 76 | 56 |
| Example 3 | No change at 60 minutes | 26 | 11 | 14 | medium dent at 6½ ft. | 70 | 31 |

What is claimed is:

1. A method for producing a curved transparent polycarbonate laminate from a polycarbonate sheet comprising the steps of:

a. preparing a substantially completely cured, rigid, transparent thermoset polyurethane sheet having a Shore D hardness less than about 70 and a tear strength greater than about 50 pli at temperatures Shore D hardness less than about 70 and a tear strength greater than about 50 pli at a temperature of from about 270° F to about 375° F;

b. thereafter directly bonding the polyurethane sheet to the polycarbonate sheet to produce a laminate wherein the polyurethane sheet is an outer layer of the laminate;

c. heating the laminate to at least about 270° F and less than about 375° F; and d. forming the laminate to a desired curvature.

10. The method claimed in claim 9 wherein the step of preparing the polyurethane sheet comprises reacting one or more aliphatic polyisocyanates with one or more saturated polyalkylene ether polyols.

11. The method claimed in claim 9 wherein the step of preparing the polyurethane sheet comprises reacting a cycloaliphatic diisocyanate with polyalkylene ether polyols.

12. The method claimed in claim 11 wherein the cycloaliphatic diisocyanate is 4,4'-methylene-bis (cyclohexyl isocyanate).

13. The method claimed in claim 9 wherein the step of directly bonding comprises fusion bonding the polyurethane sheet to the polycarbonate sheet.

14. A method for producing curved transparent polycarbonate laminates comprising the steps of:

a. preparing a substantially completely cured, rigid, transparent thermoset polyurethane sheet with a Shore D hardness less than about 70 and a tear strength greater than about 50 pli at a temperature of from about 270° F to about 375° F, and having a thickness of at least about 0.01 inch, by reacting 4,4'-methylene-bis (cyclohexyl isocyanate) with saturated polyalkylene ether polyols;

b. thereafter fusion bonding the polyurethane sheet to a polycarbonate sheet prepared from 2,2-bis (4-hydroxy-phenyl) propane to produce a laminate wherein the polyurethane sheet is an outer layer of the laminate;

c. heating the laminate to at least about 270° F and less than about 375° F; and d. forming the laminate to a desired shape.

15. A method for producing a curved transparent polycarbonate laminate from a polycarbonate sheet comprising the steps of:

a. casting an uncured thermosetting polyurethane on the polycarbonate sheet;

b. substantially completely curing the cast polyurethane into a rigid sheet at least about 0.01 inch thick on the polycarbonate sheet to directly bond the polyurethane to the polycarbonate sheet to produce a laminate wherein the polyurethane sheet is an outer layer of the laminate, and wherein the cured polyurethane sheet has a Shore D hardness less than about 70 and a tear strength greater than about 50 pli at temperatures greater than the temperature $T_1$, the polycarbonate sheet heat deflection temperature, and less than the temperature $T_2$, the polycarbonate sheet chain scission temperature;

c. heating the laminate to at least $T_1$ and less than $T_2$; and d. forming the laminate to a desired curvature.

16. The method of claim 15, comprising the additional step of fusion bonding the cured polyurethane sheet to the polycarbonate sheet.

17. The method claimed in claim 15 wherein the step of curing the polyurethane sheet comprises reacting aliphatic diisocyanates with saturated polyalkylene ether polyols.

18. The method claimed in claim 15 wherein the step of curing the polyurethane sheet comprises reacting a cycloaliphatic polyisocyanate with polyalkylene ether polyols.

19. The method claimed in claim 18 wherein the cycloaliphatic polyisocyanate is a cycloaliphatic diisocyanate.

20. The method claimed in claim 19 wherein the cycloaliphatic diisocyanate is 4,4'-methylene-bis (cyclohexyl isocyanate).

21. A method as claimed in claim 15 wherein the polycarbonate sheet is fabricated from a polycarbonate based upon 2,2-bis (4-hydroxy-phenyl) propane.

22. A method for producing curved transparent polycarbonate laminates from polycarbonate sheet fabricated from a polycarbonate based upon 2,2-bis (4-hydroxy-phenyl) propane comprising the steps of:

a. casting an uncured thermosetting polyurethane on the polycarbonate sheet;

b. substantially completely curing the cast polyurethane into a rigid sheet at least about 0.01 inch thick on the polycarbonate sheet to directly bond the polyurethane to the polycarbonate sheet to produce a laminate wherein the polyurethane sheet is an outer layer of the laminate, and wherein the cured polyurethane sheet has a Shore D hardness less than about 70 and a tear strength greater than about 50 pli at a temperatue of from about 270° F to about 375° F;

c. heating the laminate to at least about 270° F and less than about 375° F; and d. forming the laminate to a desired curvature.

23. The method of claim 22 comprising the additional step of fusion bonding the cured polyurethane sheet to the polycarbonate sheet.

24. The method claimed in claim 22 wherein the step of curing the cast polyurethane comprises reacting one or more aliphatic polyisocyanates with one or more saturated polyalkylene ether polyols.

25. The method claimed in claim 22 wherein the step of curing the cast polyurethane comprises reacting a cycloaliphatic diisocyanate with polyalkylene ether polyols.

26. The method claimed in claim 25 wherein the cycloaliphatic diisocyanate is 4,4'-methylene-bis (cyclohexyl isocyanate).

* * * * *